US010917022B2

(12) United States Patent
Akita et al.

(10) Patent No.: US 10,917,022 B2
(45) Date of Patent: Feb. 9, 2021

(54) POWER CONVERSION DEVICE AND CONTROL METHOD FOR POWER CONVERSION DEVICE

(71) Applicant: Sumitomo Electric Industries, Ltd., Osaka (JP)

(72) Inventors: Tetsuo Akita, Osaka (JP); Yusuke Shimizu, Osaka (JP); Naoki Ayai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/314,043

(22) PCT Filed: Jun. 6, 2017

(86) PCT No.: PCT/JP2017/020950
§ 371 (c)(1),
(2) Date: Dec. 28, 2018

(87) PCT Pub. No.: WO2018/012146
PCT Pub. Date: Jan. 18, 2018

(65) Prior Publication Data
US 2019/0238064 A1    Aug. 1, 2019

(30) Foreign Application Priority Data
Jul. 15, 2016    (JP) ................. 2016-140442

(51) Int. Cl.
*H02M 7/5387* (2007.01)
*H02M 1/32* (2007.01)
(Continued)

(52) U.S. Cl.
CPC ......... *H02M 7/53871* (2013.01); *H02M 1/32* (2013.01); *H02M 1/36* (2013.01);
(Continued)

(58) Field of Classification Search
CPC ...... H02M 7/53; H02M 7/53871; H02M 1/32; H02M 1/36; H02M 3/156; H02M 7/48; H02M 2001/007
See application file for complete search history.

(56) References Cited

U.S. PATENT DOCUMENTS

| 2004/0207366 A1* | 10/2004 | Sung | H02J 7/35 |
| | | | 320/140 |
| 2012/0106221 A1* | 5/2012 | Ochi | H02M 7/53871 |
| | | | 363/132 |
| 2012/0201064 A1* | 8/2012 | Asakura | H02M 7/53871 |
| | | | 363/98 |

FOREIGN PATENT DOCUMENTS

JP    2000-316282 A    11/2000

* cited by examiner

*Primary Examiner* — Jue Zhang
*Assistant Examiner* — Trinh Q Dang
(74) *Attorney, Agent, or Firm* — Baker Botts L.L.P.; Michael A. Sartori

(57) ABSTRACT

This power conversion device includes: a power conversion unit 20 provided between a DC power supply 2 and an AC electric path 3 and configured to perform DC/AC power conversion; and a control unit 14 configured to control the power conversion unit 20. The control unit 14 includes a determination unit 25 configured to determine whether or not a starting current has flowed through the AC electric path 3, and an adjustment unit 26 configured to adjust an AC voltage generated by the power conversion unit 20, on the basis of a result of the determination by the determination unit 25.

6 Claims, 12 Drawing Sheets

(51) Int. Cl.
*H02M 1/36* (2007.01)
*H02M 7/48* (2007.01)
*H02M 3/156* (2006.01)
*H02M 1/00* (2006.01)

(52) U.S. Cl.
CPC ............. *H02M 3/156* (2013.01); *H02M 7/48* (2013.01); *H02M 2001/007* (2013.01)

POWER CONVERSION DEVICE AND CONTROL METHOD FOR POWER CONVERSION DEVICE

TECHNICAL FIELD

The present invention relates to a power conversion device and a control method for a power conversion device.

This application claims priority on Japanese Patent Application No. 2016-140442 filed on Jul. 15, 2016, the entire contents of which are incorporated herein by reference.

BACKGROUND ART

A secondary battery system or a photovoltaic system installed in an ordinary home or the like includes a power conversion device for performing DC-to-AC power conversion (see, for example, Patent Literature 1).

CITATION LIST

Patent Literature

PATENT LITERATURE 1: Japanese Laid-Open Patent Publication No. 2000-316282

SUMMARY OF INVENTION

A power conversion device according to one embodiment includes: a power conversion unit provided between a DC power supply and an AC electric path and configured to perform DC/AC power conversion; and a control unit configured to control the power conversion unit, wherein the control unit includes a determination unit configured to determine whether or not a starting current has flowed through the AC electric path, and an adjustment unit configured to adjust an AC voltage generated by the power conversion unit, on the basis of a result of the determination by the determination unit.

A control method for a power conversion device according to one embodiment is a control method for a power conversion device including a power conversion unit provided between a DC power supply and an AC electric path and configured to perform DC/AC power conversion, the control method including: a determination step of determining whether or not a starting current has flowed through the AC electric path; and an adjustment step of adjusting an AC voltage generated by the power conversion unit, on the basis of a result of the determination in the determination step.

In one embodiment, besides the above power conversion device and the above control method for the power conversion device, implementation as a computer program to be executed by a computer is also possible.

DESCRIPTION OF EMBODIMENTS

Figure 1:
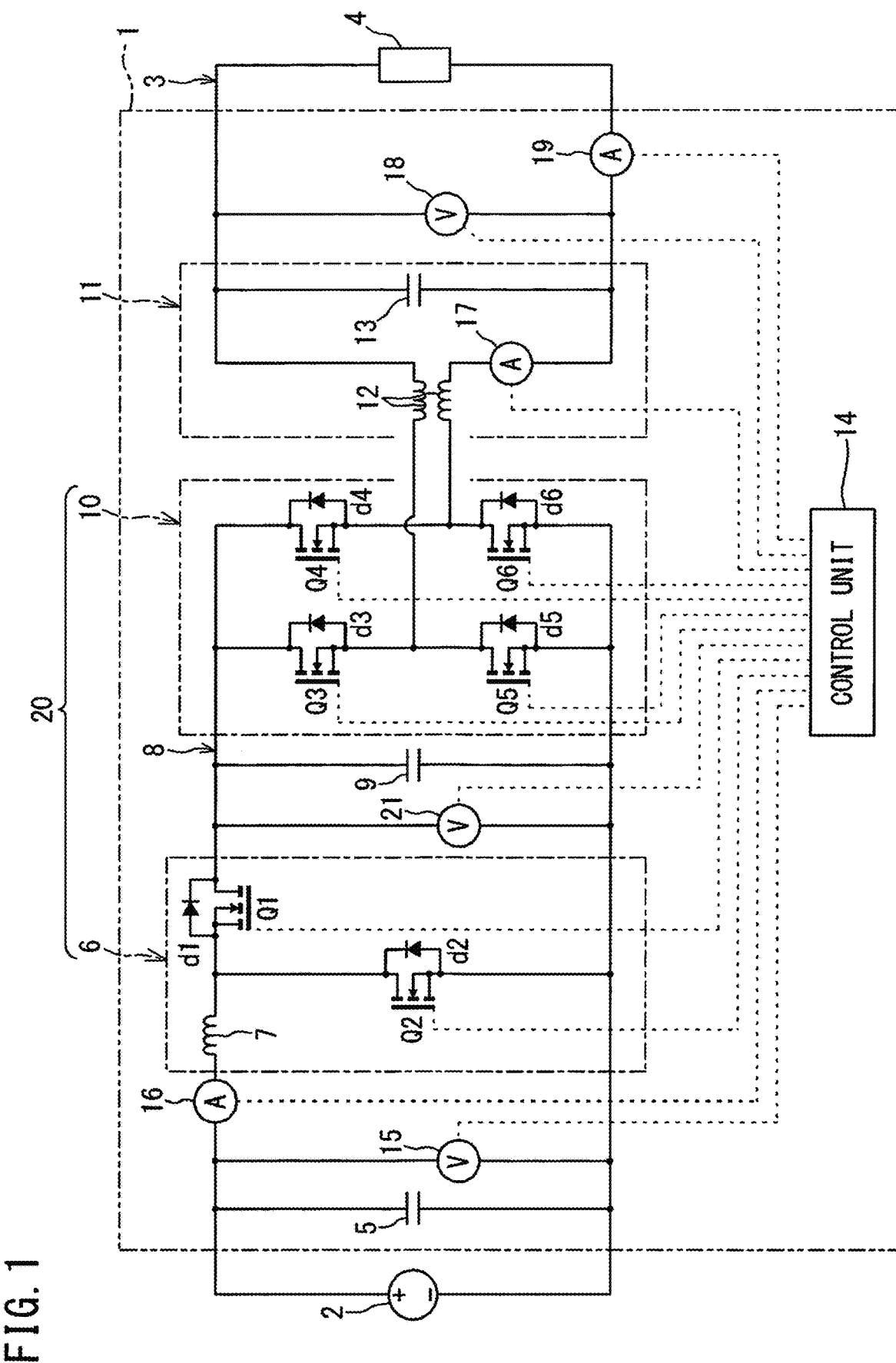
FIG. 1 shows an example of a circuit diagram of a power conversion device.

Problems to be Solved by the Present Disclosure

For example, when a load such as a motor is connected to an AC power supply, at that moment, current that is several to ten times greater than in a case of performing rated operation of the load, i.e., a so-called starting current, can flow.

In a case of performing autonomous operation of supplying a power to the load independently without interconnecting AC output of the power conversion device with an external AC power supply such as a power grid, the starting current also flows from the power conversion device.

In this regard, in order to configure the power conversion device with such specifications that flow of a starting current can be permitted, components having excessive qualities more than necessary have to be chosen for a semiconductor device, a cable, and the like, leading to increase in cost.

Therefore, a method for suppressing a starting current is desired.

Accordingly, an object is to provide technology that enables suppression of a starting current.

Effects of the Present Disclosure

According to the present disclosure, a starting current can be suppressed.

Hereinafter, preferred embodiments will be described with reference to the drawings.

Summary of Embodiments (1) A power conversion device according to one embodiment includes: a power conversion unit provided between a DC power supply and an AC electric path and configured to perform DC/AC power conversion; and a control unit configured to control the power conversion unit, wherein the control unit includes a determination unit configured to determine whether or not a starting current has flowed through the AC electric path, and an adjustment unit configured to adjust an AC voltage generated by the power conversion unit, on the basis of a result of the determination by the determination unit.

In the power conversion device configured as described above, if it is determined that a starting current has flowed through the AC electric path, the AC voltage generated by the power conversion unit can be adjusted so as to be decreased, whereby the starting current can be suppressed.

(2) In the above power conversion device, preferably, the power conversion unit includes a DC/DC converter provided between the DC power supply and a DC bus and configured to boost a DC voltage of the DC power supply to a predetermined intermediate voltage, and an inverter connected between the DC bus and the AC electric path and configured to convert the intermediate voltage to an AC voltage waveform, and the adjustment unit adjusts a voltage for the DC bus generated by the DC/DC converter and the AC voltage, on the basis of a result of the determination by the determination unit.

In this case, it is possible to adjust the AC voltage so as to suppress the starting current without boosting the DC voltage more than necessary.

(3) In the above power conversion device, the control unit may control the power conversion unit such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle.

Also in this case, it is possible to adjust the AC voltage so as to suppress the starting current without boosting the DC voltage more than necessary.

(4) Preferably, the adjustment unit controls the power conversion unit such that the AC voltage is adjusted in a vicinity of zero cross.

In this case, it is possible to suppress voltage variation caused due to adjustment of the AC voltage.

(5) In the above power conversion device, the determination unit may determine whether or not the starting current has flowed, on the basis of a current flowing between the power conversion unit and the AC electric path, and the adjustment unit may adjust the AC voltage generated by the power conversion unit, on the basis of a result of the determination by the determination unit and a result of comparison between the current and a predetermined overcurrent protection threshold value.

In this case, it is possible to suppress the starting current while considering an overcurrent.

(6) A control method for a power conversion device according to one embodiment is a control method for a power conversion device including a power conversion unit provided between a DC power supply and an AC electric path and configured to perform DC/AC power conversion, the control method including: a determination step of determining whether or not a starting current has flowed through the AC electric path; and an adjustment step of adjusting an AC voltage generated by the power conversion unit, on the basis of a result of the determination in the determination step.

The determination method for the power conversion device configured as described above can suppress the starting current.

The above control method for the power conversion device may be implemented through execution of a computer program by a computer provided to the power conversion device.

That is, the computer program is a computer program for causing a computer to execute control of a power conversion device including a power conversion unit provided between a DC power supply and an AC electric path and configured to perform DC/AC power conversion, the computer program causing the computer to execute: a determination step of determining whether or not a starting current has flowed through the AC electric path; and an adjustment step of adjusting an AC voltage outputted by the power conversion unit, on the basis of a result of the determination in the determination step.

Details of Embodiments

Hereinafter, preferable embodiments will be described with reference to the drawings.

It is noted that at least parts of embodiments described below may be optionally combined with each other.

[Configuration of Power Conversion Device]

FIG. 1 shows an example of a circuit diagram of a power conversion device. In FIG. 1, a power conversion device 1 is provided between a DC power supply 2 and an AC electric path 3, and performs DC/AC power conversion in a state in which the DC voltage of the DC power supply 2 is lower than the peak value (wave crest value) of the AC voltage of the AC electric path 3. The power conversion device 1 can supply an AC power generated on the basis of the DC power supply 2, as an autonomous output, to a load 4 connected to the AC electric path 3, for example.

The power conversion device 1 includes, as main circuit configuration elements, a DC-side capacitor 5, a power conversion unit 20, an intermediate capacitor 9, and a filter circuit 11.

The power conversion unit 20 includes a DC/DC converter 6 and an inverter 10.

The DC/DC converter 6 includes a DC reactor 7, a high-side switching element Q1, and a low-side switching element Q2, to form a DC chopper circuit. As the switching elements Q1, Q2, for example, MOSFETs (Metal-Oxide-Semiconductor Field Effect Transistors) can be used. The switching elements Q1, Q2 that are MOSFETs have diodes (body diodes) d1, d2, respectively. The switching elements Q1, Q2 are controlled by a control unit 14.

The high-voltage side of the DC/DC converter 6 is connected to a DC bus 8. The intermediate capacitor 9 connected between two lines of the DC bus 8 has a small capacitance (100 µF or smaller, e.g., several tens of µF), and exerts a smoothing function on a voltage switched at a high frequency (e.g., 20 kHz), but does not exert a smoothing function on a voltage that varies at a frequency (100 Hz or 120 Hz) about twice as high as the commercial frequency.

The inverter 10 connected to the DC bus 8 includes switching elements Q3 to Q6 forming a full-bridge circuit. The switching elements Q3 to Q6 are, for example, MOSFETs. In the case of MOSFETs, the switching elements Q3 to Q6 have diodes (body diodes) d3 to d6, respectively. The switching elements Q3 to Q6 are controlled by the control unit 14.

A filter circuit 11 is provided between the inverter 10 and the AC electric path 3. The filter circuit 11 includes an AC reactor 12, and an AC-side capacitor 13 provided on the load 4 side (right side in the drawing) with respect to the AC reactor 12. The filter circuit 11 prevents high-frequency noise occurring in the inverter 10 from passing and leaking to the AC electric path 3 side.

As circuit elements for measurement, a voltage sensor 15 and a current sensor 16 are provided on the low-voltage side (left side in the drawing) of the DC/DC converter 6. The voltage sensor 15 is connected in parallel to the DC power supply 2 and detects a voltage between both ends of the DC power supply 2. Information about the detected voltage is provided to the control unit 14. The current sensor 16 detects a current flowing through the DC/DC converter 6. Information about the detected current is provided to the control unit 14.

In addition, a voltage sensor 21 is provided on the high-voltage side (right side in the drawing) of the DC/DC converter 6. The voltage sensor 21 detects the voltage of the DC bus 8. Information about the detected voltage is provided to the control unit 14.

On the AC side, a current sensor 17 for detecting a current flowing through the AC reactor 12 is provided. Information about the current detected by the current sensor 17 is provided to the control unit 14. A voltage sensor 18 is provided in parallel to the AC-side capacitor 13. A current sensor 19 is provided to the electric path connecting the load 4 and the power conversion device 1. Information about the voltage detected by the voltage sensor 18 and information about the current detected by the current sensor 19 are provided to the control unit 14.

In a case where the DC power supply 2 is a photovoltaic panel, the power conversion device 1 performs only DC-to-AC conversion. In a case where the DC power supply 2 is a storage battery, the power conversion device 1 can perform not only DC-to-AC conversion, but also AC-to-DC conversion to charge the storage battery. That is, the inverter 10 and the DC/DC converter 6 can operate to transmit power in both directions.

[Minimum Switching Conversion Method]

Next, the outline of operation in a minimum switching method executed by the power conversion device 1 will be described.

Figure 2:
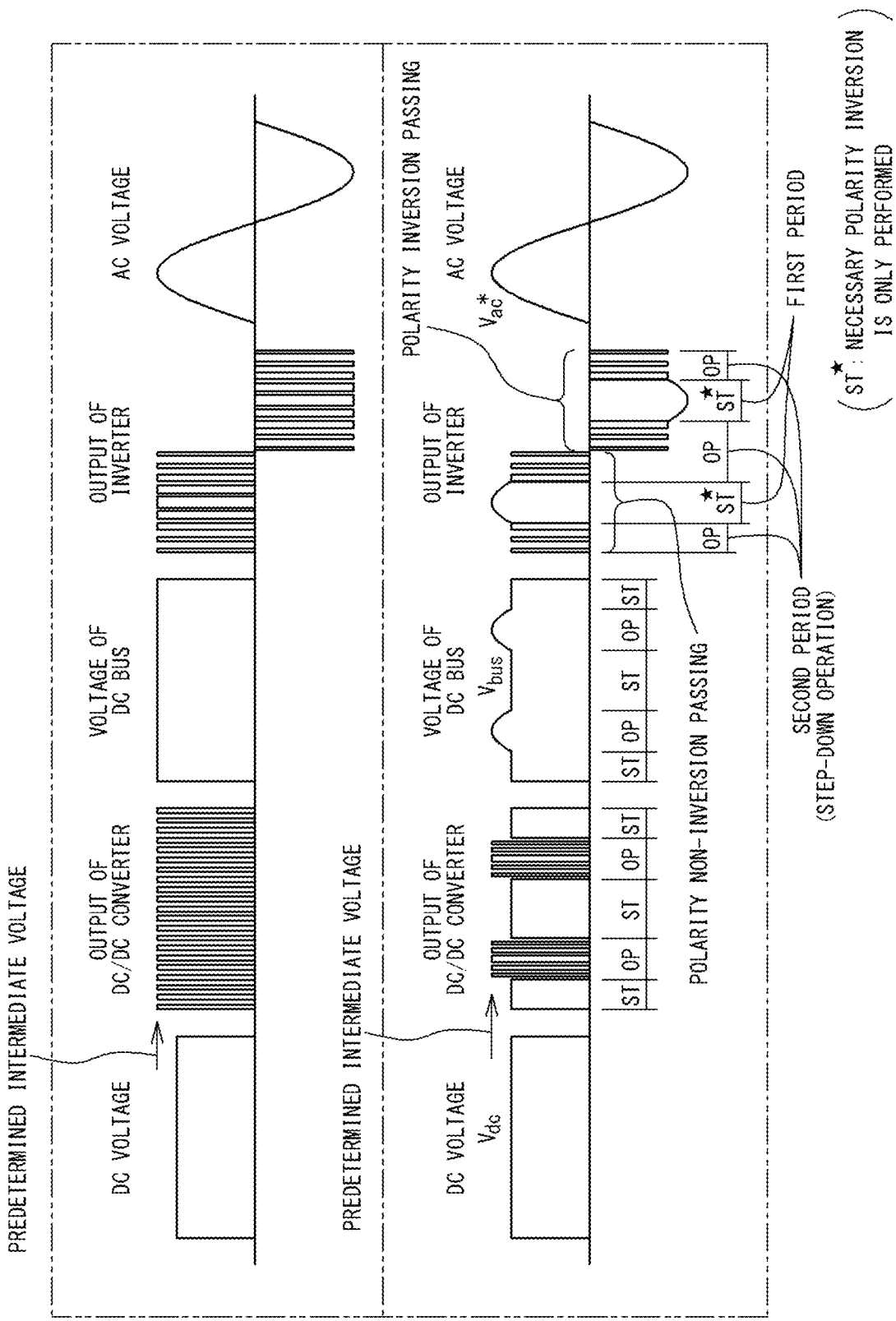
FIG. 2 is a waveform diagram (horizontally depicted) schematically showing the feature of operations of a DC/DC converter and an inverter in a minimum switching conversion method.
Figure 3:
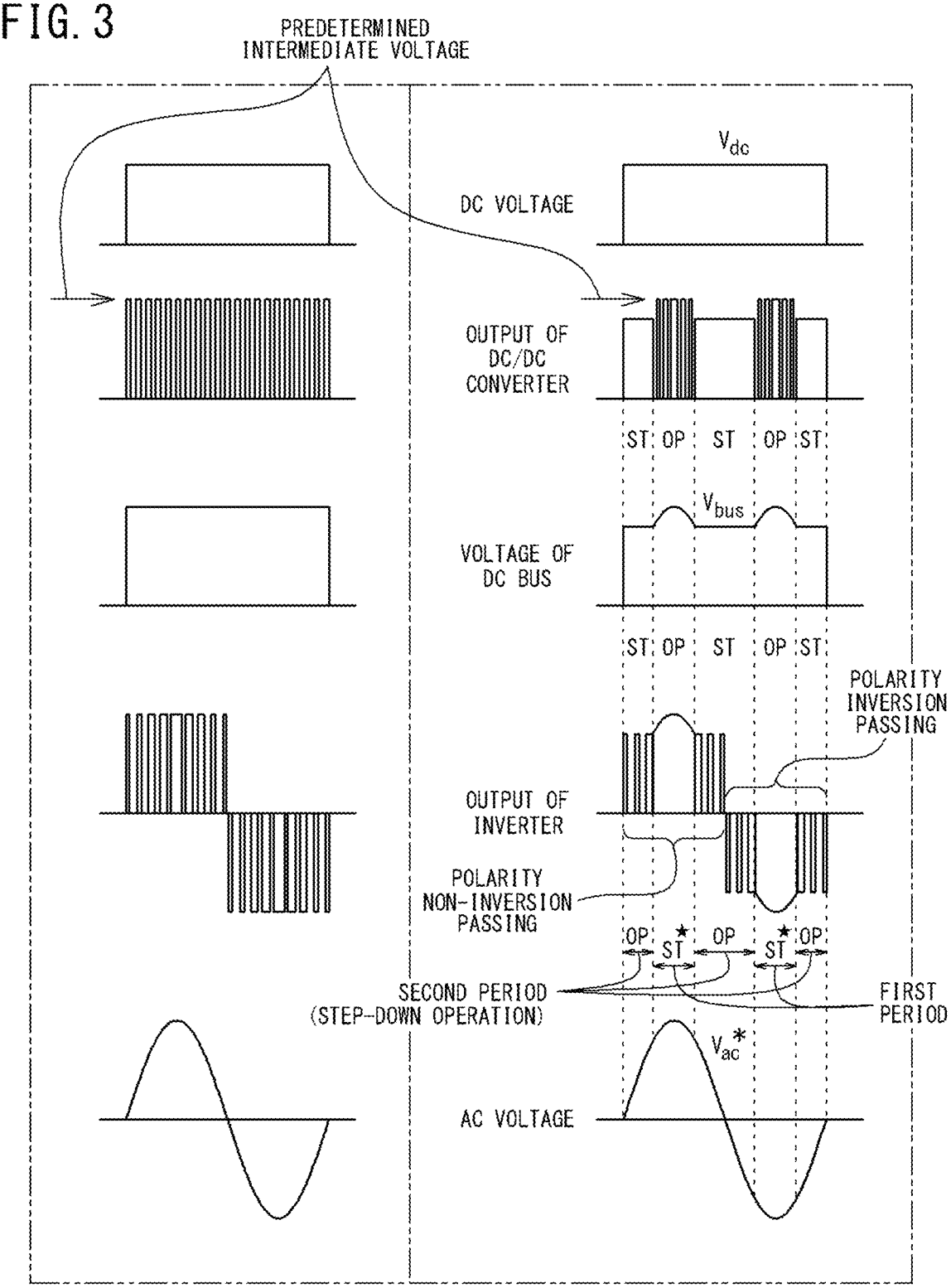
FIG. 3 is a waveform diagram (vertically depicted) schematically showing the feature of operations of the DC/DC converter and the inverter in the minimum switching conversion method.

FIG. 2 and FIG. 3 are waveform diagrams schematically showing the feature of operations of the DC/DC converter 6 and the inverter 10 in the minimum switching conversion method. FIG. 2 and FIG. 3 show the same content, but in particular, FIG. 2 shows the relationship of amplitudes from DC input to AC output in an easily understood manner, and in particular, FIG. 3 shows the timings of the control in an easily understood manner. The upper stage in FIG. 2 and the left column in FIG. 3 are waveform diagrams showing conventional switching control which is not based on the minimum switching conversion method, for comparison. The lower stage in FIG. 2 and the right column in FIG. 3 are waveform diagrams showing operation in the minimum switching conversion method.

First, at the upper stage in FIG. 2 (or the left column in FIG. 3), in the conventional switching control, output at the mutual connection point among the pair of switching elements and the DC reactor in the DC/DC converter in response to the inputted DC voltage is a pulse train having a higher value than the DC voltage and arranged at regular intervals. This output is smoothed by the intermediate capacitor and then arises as the voltage of the DC bus. On the other hand, the inverter performs switching under PWM (Pulse Width Modulation) control while inverting the polarity per half cycle. As a result, a sinusoidal AC voltage is obtained through final smoothing.

Next, in the minimum switching conversion method at the lower stage in FIG. 2 (or the right column in FIG. 3), the DC/DC converter 6 and the inverter 10 operate in accordance with a result of comparison between the absolute value of the instantaneous value of a voltage target value $V_{ac}^*$ of an AC waveform, and a DC voltage $V_{dc}$ which is the input. Here, $V_{ac}^*$ is a voltage target value, at the AC-side output end of the inverter 10, for which influence of the filter circuit 11 on current and voltage is taken into consideration. $V_{dc}$ is a value obtained by considering voltage drop by the DC reactor 7 with respect to the voltage between both ends of the DC power supply 2. When the absolute value of the voltage target value $V_{ac}^*$ satisfies $|V_{ac}^*|<V_{dc}$ (or $|V_{ac}^*| \leq V_{dc}$), the DC/DC converter 6 is stopped ("ST" in the drawing), and when the absolute value of the voltage target value $V_{ac}^*$ satisfies $|V_{ac}^*| \geq V_{dc}$ (or $|V_{ac}^*|>V_{dc}$), the DC/DC converter 6 performs step-up operation ("OP" in the drawing). The output of the DC/DC converter 6 is smoothed by the intermediate capacitor 9, and then arises as a voltage $V_{bus}$ on the DC bus 8 as shown in the drawing.

Here, the intermediate capacitor 9 has a small capacitance. Therefore, a partial waveform to be around the peak of the absolute value of the AC waveform is left as it is without being smoothed. That is, the intermediate capacitor 9 has such a small capacitance that, while the smoothing acts to such an extent that eliminates the trace of the high-frequency switching by the DC/DC converter 6, a low-frequency wave having a frequency about twice as high as the commercial frequency cannot be smoothed.

On the other hand, as for the inverter 10, in accordance with a result of comparison between the absolute value of the voltage target value $V_{ac}^*$ and the DC voltage $V_{dc}$, when $|V_{ac}^*|<V_{dc}$ (or $|V_{ac}^*| \leq V_{dc}$) is satisfied, high-frequency switching is performed ("OP" in the drawing), and when $|V_{ac}^*| \geq V_{dc}$ (or $|V_{ac}^*|>V_{dc}$) is satisfied, the high-frequency switching is stopped ("ST" in the drawing). When the inverter 10 stops high-frequency switching, the inverter 10 selects either a state in which the switching elements Q3, Q6 are ON and the switching elements Q4, Q5 are OFF (non-inversion), or a state in which the switching elements Q3, Q6 are OFF and the switching elements Q4, Q5 are ON (inversion), thereby only performing necessary polarity inversion. The output of the inverter 10 is smoothed by the AC reactor 12 and the AC-side capacitor 13, whereby desired AC output is obtained.

Here, as shown in the right column in FIG. 3, the DC/DC converter 6 and the inverter 10 alternately perform high-frequency switching. When the DC/DC converter 6 performs step-up operation, the inverter 10 stops high-frequency switching and only performs necessary polarity inversion for the voltage of the DC bus 8. On the other hand, when the inverter 10 performs high-frequency switching operation, the DC/DC converter 6 is stopped and the voltage between both ends of the DC-side capacitor 5 arises on the DC bus 8 via the DC reactor 7 and the diode d1.

As described above, the operations by the DC/DC converter 6 and the inverter 10 in the minimum switching conversion method are performed. In such a power conversion device 1, since stop periods arise in high-frequency switching of the switching element Q1 to Q6, the number of times of high-frequency switching in total can be decreased. Thus, the efficiency of power conversion can be greatly improved.

[Control for AC Voltage]

Figure 4:
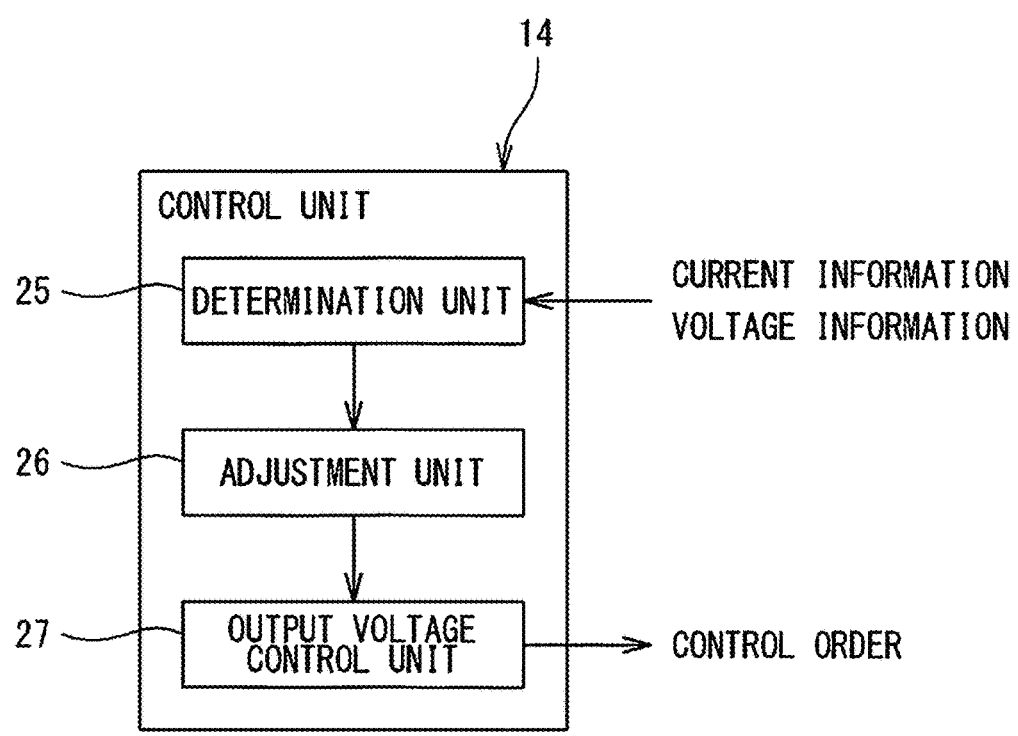
FIG. 4 is a block diagram showing a function of a control unit.

FIG. 4 is a block diagram showing a function of the control unit 14.

The control unit 14 controls the switching elements Q1 to Q6, thereby controlling the power conversion unit 20 (DC/DC converter 6 and inverter 10).

The control unit 14 controls the power conversion unit 20 so as to perform power conversion by the minimum switching method.

The control unit 14 can be configured from a computer including a CPU (Central Processing Unit) or a storage unit, for example. In this case, the computer executes a computer program to implement later-described functions that the control unit 14 has. The computer program is stored in the storage unit. Alternatively, the control unit 14 can be configured from a circuit using only hardware not including a computer, for example.

The control unit 14 includes a determination unit 25, an adjustment unit 26, and an output voltage control unit 27 as function units implemented by execution of the above computer program.

The determination unit 25 has a function of determining whether or not a starting current has flowed through the AC electric path 3 (FIG. 1), on the basis of current information given from at least one of the current sensor 17 and the current sensor 19. The determination unit 25 calculates a measured value (measured current value) of a current flowing through the AC electric path 3, from the current information. The determination unit 25 compares the calculated measured current value with a predetermined starting current threshold value, thereby determining whether or not a starting current has flowed through the AC electric path 3.

The determination unit 25 calculates a measured value (measured voltage value) of an AC voltage outputted from the power conversion unit 20 (power conversion device 1), on the basis of voltage information given from the voltage sensor 18. Further, the determination unit 25 calculates the effective value (measured effective value) of the measured voltage value.

The determination unit 25 uses the measured effective value for a starting current suppression process described later.

The adjustment unit 26 has a function of adjusting the effective value of an AC voltage generated by the power conversion unit 20, on the basis of a result of the determination by the determination unit 25.

The output voltage control unit 27 controls the effective value of an AC voltage outputted from the power conversion unit 20, on the basis of a command value for an AC voltage to be outputted.

Figure 5:
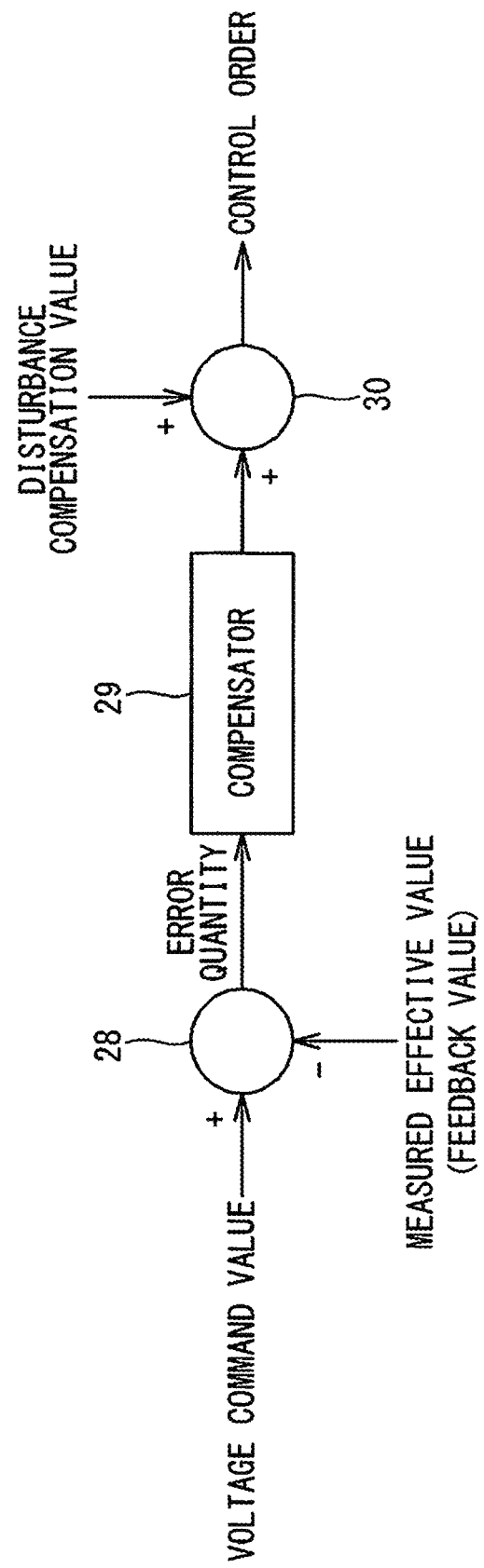
FIG. 5 is a control block diagram showing a manner in which an output voltage control unit controls the effective value of an AC voltage outputted from a power conversion unit.

FIG. 5 is a control block diagram showing a manner in which the output voltage control unit 27 controls the effective value of an AC voltage outputted from the power conversion unit 20.

The output voltage control unit 27 includes a first adder 28, a compensator 29, and a second adder 30 as function units for controlling the power conversion unit 20.

The output voltage control unit 27 gives a voltage command value for an AC voltage and a measured effective value of an AC voltage outputted from the power conversion unit 20, to the first adder 28.

When the voltage command value and the measured effective value which is a feedback value are given, the first adder 28 calculates an error quantity which is a difference therebetween. It is noted that the voltage command value is a command value for the effective value of the AC voltage.

The first adder 28 gives the error quantity between the voltage command value and the measured effective value to the compensator 29.

The compensator 29 outputs a control order for the power conversion unit 20 on the basis of the error quantity. When the error quantity is given, the compensator 29 outputs a control order so that the error quantity is converged and the effective value of an AC voltage outputted from the power conversion device 1 can become the voltage command value.

The compensator 29 gives the control order to the second adder 30.

A disturbance compensation value is given to the second adder 30, together with the control order. The disturbance compensation value is a value for compensating for error occurring in the control order due to disturbance in control of the power conversion unit 20 in advance.

The second adder 30 outputs the control order to which the disturbance compensation value has been added.

The output voltage control unit 27 gives the control order outputted from the second adder 30, to the power conversion unit 20, thereby controlling the effective value of an AC voltage outputted from the power conversion unit 20.

Returning to FIG. 4, the adjustment unit 26 gives a voltage command value to the output voltage control unit 27 as necessary, thereby adjusting the AC voltage generated by the power conversion unit 20.

When the voltage command value is given from the adjustment unit 26, the output voltage control unit 27 adopts the given voltage command value instead of the voltage command value that is being used in the control at present, thereby controlling the effective value of an AC voltage outputted from the power conversion unit 20.

Regarding the control order given from the output voltage control unit 27 to the power conversion unit 20, control orders are given to the DC/DC converter 6 and the inverter 10, respectively.

The DC/DC converter 6 outputs a voltage for the DC bus on the basis of the given control order. The inverter 10 outputs an AC voltage on the basis of the given control order.

Therefore, when the adjustment unit 26 gives a voltage command value to the output voltage control unit 27, the control orders from the output voltage control unit 27 are given to the DC/DC converter 6 and the inverter 10, respectively.

Thus, the adjustment unit 26 adjusts the voltage for the DC bus generated by the DC/DC converter 6 and the AC voltage generated by the inverter 10.

Figure 6:
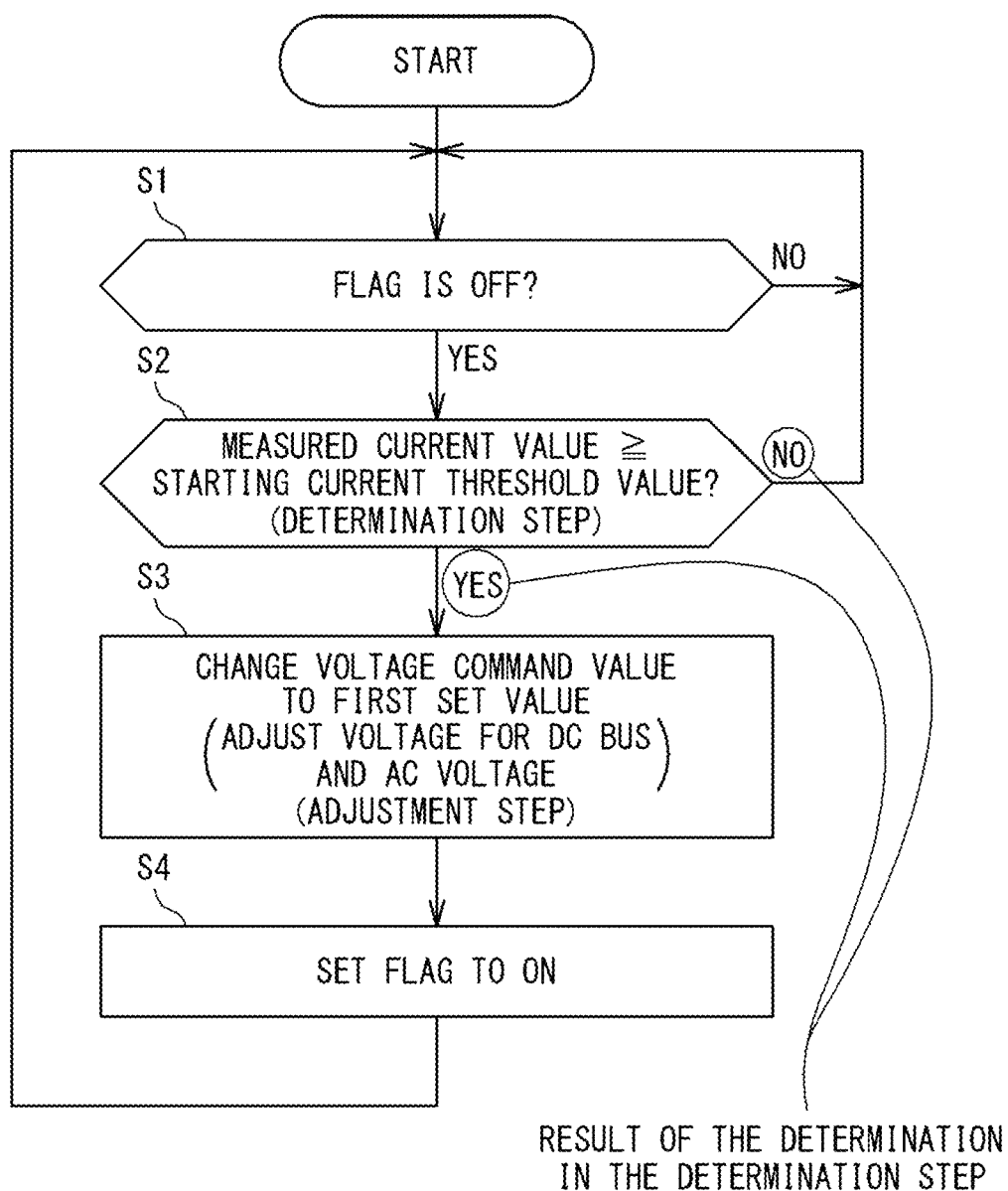
FIG. 6 is a flowchart showing a suppression process for a starting current, performed by a determination unit and an adjustment unit of the control unit, and shows a process for detecting occurrence of a starting current and starting the suppression process for the starting current.
Figure 7:
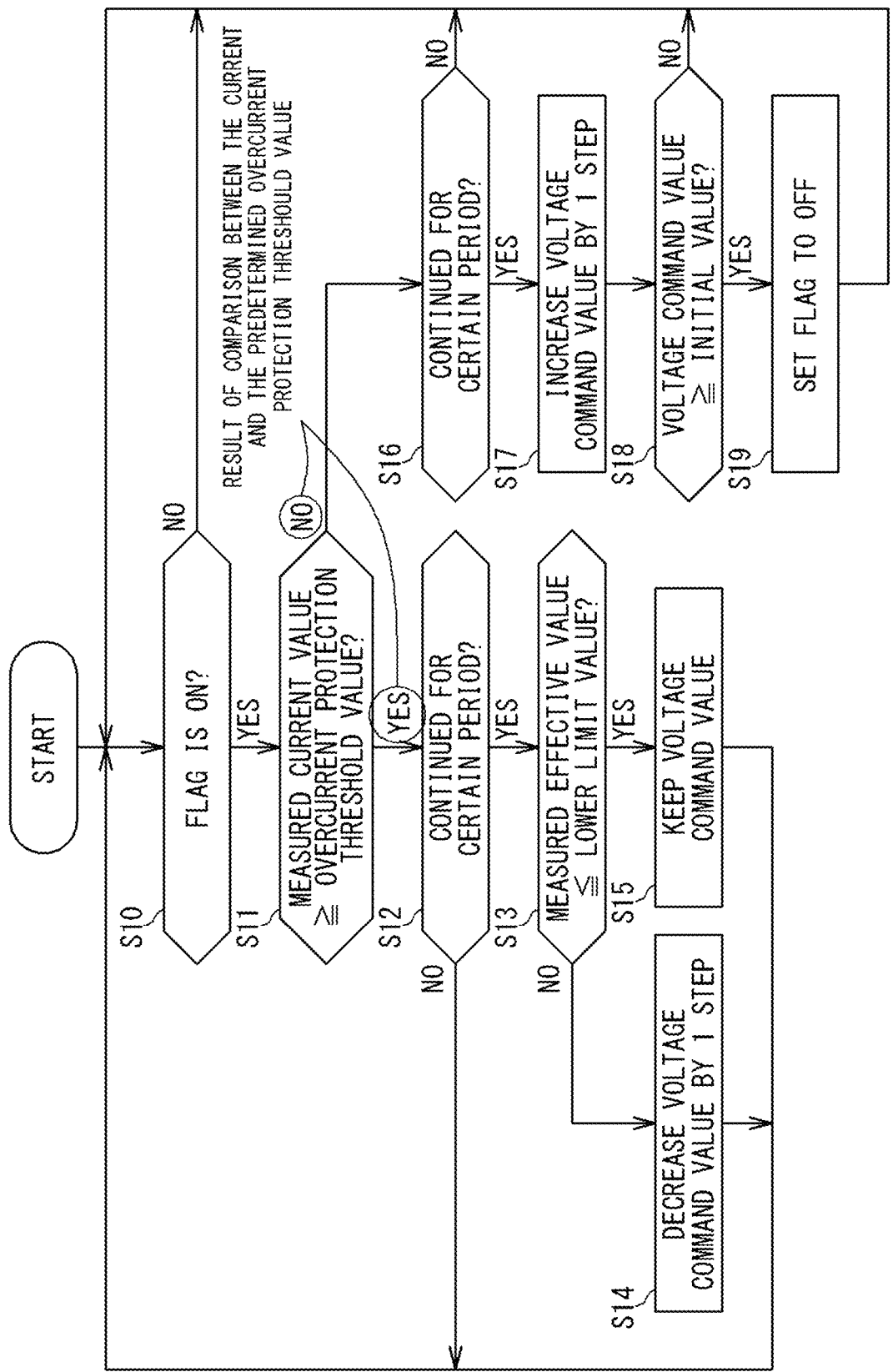
FIG. 7 is a flowchart showing the suppression process for the starting current, performed by the determination unit and the adjustment unit of the control unit, and shows a process from execution of the starting current suppression process until finish thereof.

FIG. 6 and FIG. 7 are flowcharts showing a suppression process for a starting current, performed by the determination unit 25 and the adjustment unit 26 of the control unit 14.

FIG. 6 shows a process for detecting occurrence of a starting current and starting the suppression process for the starting current.

First, in step S1, the control unit 14 determines whether or not a flag indicating whether or not the suppression process for a starting current is being executed is OFF (step S1). This flag is information indicating whether or not the determination unit 25 and the adjustment unit 26 are executing the starting current suppression process, and is stored in the control unit 14.

In a case where the flag is set at ON, the flag indicates that the starting current suppression process is being executed. In a case where the flag is set at OFF, the flag indicates that the starting current suppression process is not being executed.

If it is determined that the flag is not OFF (the flag is ON) in step S1, the control unit 14 returns to step S1. Therefore, in a case where the starting current suppression process is being executed, the control unit 14 repeats step S1 until the flag is set to OFF and the starting current suppression process is finished.

If it is determined that the flag is OFF in step S1, the determination unit 25 of the control unit 14 compares a measured current value of a current flowing through the AC electric path 3 with the starting current threshold value, thereby determining whether or not the measured current value is equal to or greater than the starting current threshold value (step S2).

It is noted that the starting current threshold value is a threshold value for determining whether or not a starting current is flowing through the AC electric path 3, and is set at such a value that it can be determined that a starting current is flowing through the AC electric path 3. Thus, the determination unit 25 can determine whether or not a starting current has flowed through the AC electric path 3.

Specifically, the starting current threshold value is set to be equal to or greater than twice the rated current value, for example. In the present embodiment, if the power conversion device 1 is rated at 10 amperes, the starting current threshold value is set at 23 amperes.

If it is determined that the measured current value is not equal to or greater than the starting current threshold value in step S2, the determination unit 25 returns to step S1. Therefore, in a case where the flag is set at OFF, the determination unit 25 repeats the determination as to whether or not the measured current value is equal to or greater than the starting current threshold value, until it is determined that the measured current value is equal to or greater than the starting current threshold value.

In a case where the flag is set at OFF, as described above, the power conversion device 1 is in a normal operation state in which the starting current suppression process is not being executed. In this case, the output voltage control unit 27 controls the effective value of an AC voltage outputted from the power conversion unit 20, using an initial value of the voltage command value. In the present embodiment, the initial value of the voltage command value is set at 101 volts, for example.

If it is determined that the measured current value is equal to or greater than the starting current threshold value in step S2, the adjustment unit 26 gives, as the voltage command value, a first set value which is lower than the initial value, to the output voltage control unit 27 (step S3). Thus, the output voltage control unit 27 changes the voltage command value used for control, from the initial value to the first set value, thereby performing control so that the effective value of an AC voltage outputted from the power conversion unit 20 becomes the first set value. In this way, the power conversion device 1 can perform adjustment so as to decrease the effective value of an AC voltage outputted from the power conversion unit 20, and thus can suppress the starting current that has just occurred.

It is noted that the first set value is set at a value that is lower than the initial value and that allows effective suppression of a starting current when the starting current flows. In the present embodiment, the first set value is set at 80 volts, for example.

After the adjustment unit 26 gives the first set value as the voltage command value to the output voltage control unit 27, the control unit 14 proceeds to step S4 to set the flag to ON (step S4), and then returns to step S1. After the flag is set to ON, the determination in step S1 is repeated until the flag is set to OFF.

As described above, if it is determined that the measured current value of a current flowing through the AC electric path 3 is equal to or greater than the starting current threshold value in step S2, the control unit 14 reduces the AC voltage by changing the voltage command value, and starts the starting current suppression process immediately.

The flowchart shown in FIG. 6 is a process for detecting occurrence of a starting current and starting the suppression process for the starting current. Therefore, it is necessary to execute the process at a comparatively high frequency in order to detect occurrence of a starting current immediately. For example, the process shown in FIG. 6 is executed at 20 kHz (cycle of 0.05 milliseconds).

FIG. 7 is a flowchart showing a process from execution of the starting current suppression process until finish thereof.

In step S10, the control unit 14 determines whether or not the flag is ON (step S10).

If the flag is not ON (the flag is OFF), the starting current suppression process is not being executed and therefore the control unit 14 returns to step S10 without executing step S11 and the subsequent steps.

If the flag is ON, the starting current suppression process is being executed and therefore the determination unit 25 of the control unit 14 proceeds to step S11 to compare the measured current value of a current flowing through the AC electric path 3 with an overcurrent protection threshold value, thereby determining whether or not the measured current value is equal to or greater than the overcurrent protection threshold value (step S11).

It is noted that the overcurrent protection threshold value is a threshold value for determining whether or not a current greater than the rated value of the power conversion device 1 has flowed, and is set at a value slightly greater than the rated current value of the power conversion device 1. In the present embodiment, if the rated value of the power conversion device 1 is 10 amperes as described above, the overcurrent protection threshold value is set at 12 amperes.

If it is determined that the measured current value is equal to or greater than the overcurrent protection threshold value in step S11, the determination unit 25 determines whether or not a state in which the measured current value is determined to be equal to or greater than the overcurrent protection threshold value has continued for a certain period (step S12).

In step S11, the determination unit 25 determines whether or not a state in which the measured current value is determined to be equal to or greater than the overcurrent protection threshold value has continued for the certain period, on the basis of the number of times of consecutive determinations that the measured current value has been consecutively determined to be equal to or greater than the overcurrent protection threshold value.

If the number of times of consecutive determinations is smaller than a predetermined number of times, the determination unit 25 determines that the above state has not continued for the certain period yet, and returns to step S1.

If the number of times of consecutive determinations is equal to or greater than the predetermined number of times, the determination unit 25 determines that the above state has continued for the certain time period, and proceeds to step S13.

It is noted that the predetermined number of times is set at a number of times that can ensure such a period that the measured current value can be stably obtained.

If the determination unit 25 determines that a state in which the measured current value is determined to be equal to or greater than the overcurrent protection threshold value has continued for the certain period in step S12 and proceeds to step S13, the determination unit 25 determines whether or not the measured effective value of an AC voltage outputted from the power conversion unit 20 (power conversion device 1) is equal to or smaller than a predetermined lower limit value (step S13).

If it is determined that the measured effective value is equal to or smaller than the lower limit value in step S13, the adjustment unit 26 returns to step S1 without giving a voltage command value to the output voltage control unit 27 (step S15). Thus, the output voltage control unit 27 uses, for the control, the voltage command value that is being used for the control at present, without changing. Therefore, the voltage command value is kept as it is, and the effective value of an AC voltage outputted from the power conversion unit 20 is also kept as it is (step S15).

If it is determined that the measured effective value is not equal to or smaller than the lower limit value (the measured effective value is greater than the lower limit value) in step S13, the adjustment unit 26 gives, to the output voltage control unit 27, a voltage command value obtained by decreasing the voltage value by 1 step from the present voltage command value being given to the output voltage control unit 27, and then returns to step S1 (step S14). Thus, the output voltage control unit 27 uses, for the control, the voltage command value having a voltage value lower by 1 step than the voltage command value that has been thus far used for the control. In this way, the voltage command value is decreased by 1 step in voltage value, and the effective value of an AC voltage outputted from the power conversion unit 20 is also adjusted to be lowered by 1 step in voltage value (step S14).

As described above, in a case where the measured current value is equal to or greater than the overcurrent protection threshold value, the control unit 14 performs control so as to decrease the voltage command value on a 1-step basis until the measured effective value becomes equal to or smaller than the lower limit value (step S11 to S15).

It is noted that continuing to decrease the voltage command value might cause some influence, e.g., input voltage shortage, on the load 4 connected to the AC electric path 3, and therefore is not preferable. Therefore, the lower limit value is provided for the measured effective value, thereby performing control such that the measured effective value does not become equal to or smaller than the lower limit value.

Accordingly, the lower limit value is set at such a voltage value that does not influence the load 4. In the present embodiment, the lower limit value is set at 75 volts.

In addition, 1 step which is the adjustment width for adjusting the voltage value of the voltage command value is set at 2 volts, for example. Therefore, the adjustment unit 26 decreases the voltage command value on a 2-volt basis in step S14.

Immediately after it is determined that a starting current has flowed through the AC electric path 3, the adjustment unit 26 gives the first set value as the voltage command value to the output voltage control unit 27, thereby changing the voltage command value of the output voltage control unit 27 from the initial value to the first set value.

In a case of further decreasing the voltage command value from the first set value, the adjustment unit 26 performs control so as to decrease the voltage command value on 1-step basis as described above.

In a case of adjusting the effective value of an AC voltage outputted from the power conversion unit 20 in step S14, the adjustment unit 26 controls the power conversion unit 20 so that the effective value of the AC voltage is adjusted in the vicinity of zero cross of the AC waveform of the AC voltage.

Thus, voltage variation caused due to adjustment of the AC voltage can be suppressed.

It is noted that the vicinity of zero cross refers to a period which is around a zero cross timing including the zero cross timing in the AC waveform of the AC voltage and during which the AC voltage can be regarded as being 0 volts.

If it is determined that the measured current value of a current flowing through the AC electric path 3 is not equal to or greater than the overcurrent protection threshold value (the measured current value is smaller than the overcurrent protection threshold value) in step S11, the determination unit 25 determines whether or not a state in which the measured current value is determined to be not equal to or greater than the overcurrent protection threshold value has continued for a certain period (step S16).

In step S11, the determination unit 25 determines whether or not a state in which the measured current value is determined to be not equal to or greater than the overcurrent protection threshold value has continued for the certain period, on the basis of the number of times of consecutive determinations that the measured current value has been consecutively determined to be not equal to or greater than the overcurrent protection threshold value.

If the number of times of consecutive determinations is smaller than a predetermined number of times, the determination unit 25 determines that the above state has not continued for the certain period yet, and returns to step S1.

If the number of times of consecutive determinations is equal to or greater than the predetermined number of times, the determination unit 25 determines that the above state has continued for the certain period, and proceeds to step S17.

It is noted that the predetermined number of times is the same as that in step S12, and is set at a number of times that can ensure such a period that the measured current value can be stably obtained.

If it is determined that a state in which the measured current value is determined to be not equal to or greater than the overcurrent protection threshold value has continued for the certain period in step S16 and the process proceeds to step S17, the adjustment unit 26 gives, to the output voltage control unit 27, a voltage command value obtained by increasing the voltage value by 1 step from the present voltage command value being given to the output voltage control unit 27 (step S17). Thus, the output voltage control unit 27 uses, for the control, a voltage command value having a voltage value higher by 1 step than the voltage command value that has been thus far used for the control. In this way, the voltage command value is increased by 1 step in voltage value, and the effective value of an AC voltage outputted from the power conversion unit 20 is also adjusted to be raised by 1 step in voltage value (step S17).

Also in the case of adjusting the effective value of an AC voltage outputted from the power conversion unit 20 in step S17, the adjustment unit 26 controls the power conversion unit 20 so that the effective value of the AC voltage is adjusted in the vicinity of zero cross in the AC waveform of the AC voltage, as in step S14.

After the voltage command value increased by 1 step in voltage value is given to the output voltage control unit 27 in step S17, the determination unit 25 proceeds to step S18 to determine whether or not the voltage command value given to the output voltage control unit 27 is equal to or greater than the initial value (step S18).

If the determination unit 25 determines that the voltage command value given to the output voltage control unit 27 is not equal to or greater than the initial value (the voltage command value is smaller than the initial value) in step S18, the determination unit 25 returns to step S1.

If the determination unit 25 determines that the voltage command value given to the output voltage control unit 27 is equal to or greater than the initial value in step S18, the control unit 14 proceeds to step S19 to set the flag to OFF, and then returns to step S1.

As described above, in a case where the measured current value is not equal to or greater than the overcurrent protection threshold value, the control unit 14 controls the voltage command value so as to be increased on a 1-step basis until the voltage command value becomes equal to or greater than the initial value (steps S11, S16 to S19).

In this way, if it is determined that a starting current has flowed through the AC electric path 3, the control unit 14 performs adjustment so as to decrease the effective value of an AC voltage outputted from the power conversion unit 20. Further, in step S11, the control unit 14 compares the measured current value with the overcurrent protection threshold value, and through steps S11 to S19, the control unit 14 performs control so as not to cause the measured current value to exceed the overcurrent protection threshold value and so as to keep the effective value of the AC voltage as high as possible.

In a case where the measured current value is not equal to or greater than the overcurrent protection threshold value (step S11) and the voltage command value is equal to or greater than the initial value (step S18), it can be determined that a starting current is no longer flowing through the AC electric path 3. Therefore, if it is determined that the voltage command value given to the output voltage control unit 27 is equal to or greater than the initial value in step S18, the control unit 14 proceeds to step S19 to set the flag to OFF, thus finishing the starting current suppression process (step S19).

When the starting current suppression process is finished, the adjustment unit 26 causes the output voltage control unit 27 to control the effective value of an AC voltage outputted from the power conversion unit 20 using the initial value of the voltage command value.

As described above, when it is determined that a starting current has flowed through the AC electric path 3, the adjustment unit 26 performs adjustment so as to decrease the effective value of an AC voltage outputted from the power conversion unit 20, and further, in step S11, the measured current value is compared with the overcurrent protection threshold value, and on the basis of a result of the comparison, it is determined whether to perform adjustment so as to decrease the effective value of an AC voltage outputted from the power conversion unit 20 or perform adjustment so as to increase the effective value.

In this way, the power conversion device 1 can suppress the starting current while considering an overcurrent flowing through the device.

The flowchart shown in FIG. 7 is a process from execution of the starting current suppression process until finish thereof. That is, this process is a process after occurrence of a starting current is detected through the process shown in FIG. 6. Therefore, it is not necessary to execute the process at a frequency as high as that of the flowchart shown in FIG. 6. Accordingly, the process shown in FIG. 7 is executed at 50 Hz (cycle of 0.02 seconds).

In the power conversion device 1 configured as described above, if it is determined that a starting current has flowed through the AC electric path 3, the adjustment unit 26 gives the first set value as the voltage command value to the output voltage control unit 27, thereby changing the voltage command value of the output voltage control unit 27 from the initial value to the first set value. Thus, the effective value of an AC voltage outputted from the power conversion unit 20 is adjusted to be decreased, whereby the starting current can be suppressed.

In the above embodiment, the adjustment unit 26 adjusts the voltage for the DC bus generated by the DC/DC converter 6 and the AC voltage generated by the inverter 10. Therefore, it is possible to adjust the AC voltage so as to suppress the starting current without boosting the DC voltage more than necessary.

The power conversion device 1 of the above embodiment adopts the minimum switching conversion method. Therefore, it is possible to adjust the AC voltage so as to suppress the starting current without boosting the DC voltage more than necessary.

In the above embodiment, the case where the effective value of an AC voltage outputted from the power conversion unit 20 is adjusted to be decreased on the basis of a result of determination by the determination unit 25, has been shown as an example. However, for example, after the effective value of an AC voltage outputted from the power conversion unit 20 is decreased in response to the determination unit 25 determining that a starting current is flowing through the AC electric path 3, if determination that a starting current is not flowing through the AC electric path 3 has continued for a certain period or longer, the adjustment unit 26 may perform adjustment so as to increase the effective value of an AC voltage outputted from the power conversion unit 20. In this case, the certain period is set to be long enough that the starting current once caused disappears.

[Verification Test]

Next, a result of verification regarding the starting current suppression effect by the power conversion device 1 will be described.

As an example device, the above power conversion device 1 was used, and evaluation was performed by monitoring the measured voltage value and the measured current value when a starting current flows.

Figure 8:
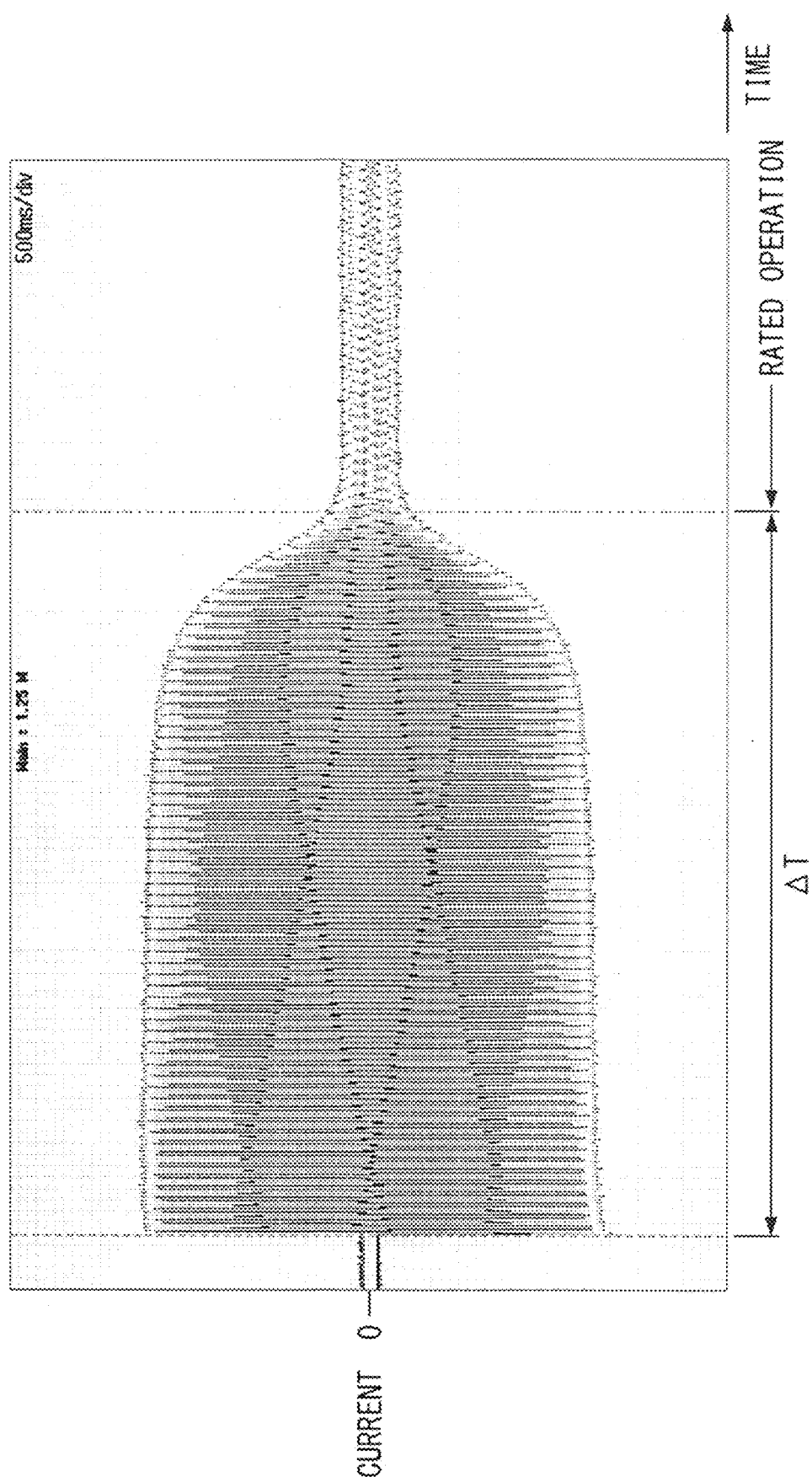
FIG. 8 is a graph showing a result of measurement of a starting current flowing through the power conversion device in verification.

FIG. 8 is a graph showing a result of measurement of a starting current flowing in the power conversion device 1 in the verification. In FIG. 8, the horizontal axis indicates time and the vertical axis indicates current.

In the verification, a starting current flowing through the power conversion device 1 was generated by activating an electric motor (rated at about 365 W) connected as a load to the power conversion device 1.

In FIG. 8, the starting current flows during a period ΔT. The period ΔT is about 3.2 seconds. After the period ΔT has elapsed, the electric motor is in a rated operation state and a current of about 4 amperes flows.

During the period ΔT in which the starting current flows, a current having a peak current of 25 amperes flows.

Figure 9:
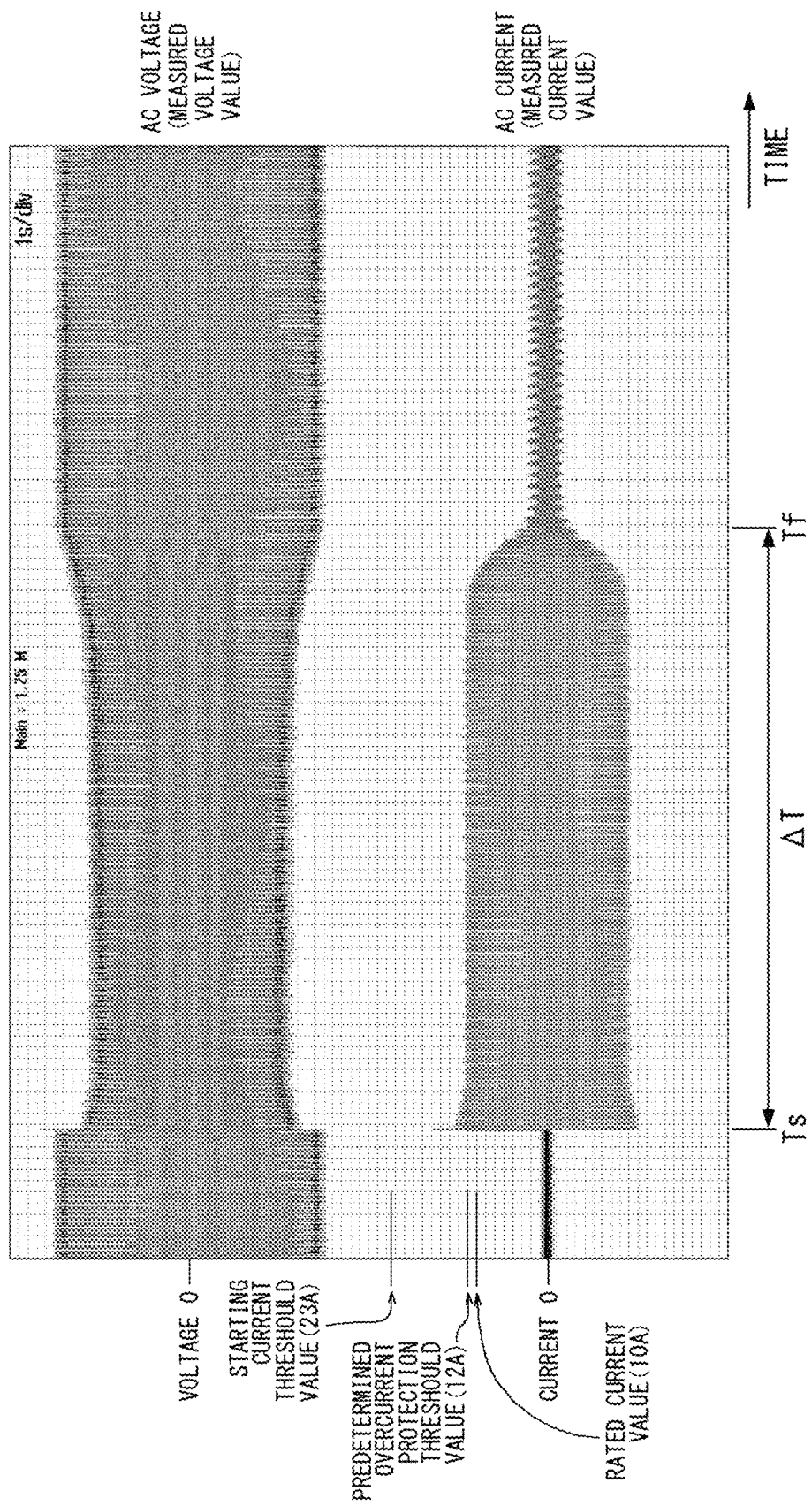
FIG. 9 is an example of graphs showing an AC voltage outputted from the power conversion unit and a current flowing through an AC electric path, when the starting current shown in FIG. 8 flows.

FIG. 9 is an example of graphs showing an AC voltage outputted from the power conversion unit 20 and a current flowing through the AC electric path 3, when the starting current shown in FIG. 8 flows.

In FIG. 9, the AC voltage outputted from the power conversion unit 20 is shown at the upper stage, and the current flowing through the AC electric path 3 is shown at the lower stage. The horizontal axis indicates time, and the graph showing the AC voltage and the graph showing the current are shown correspondingly to each other in the time direction.

The graph showing the AC voltage indicates the measured voltage value of the AC voltage outputted from the power conversion unit 20. The measured voltage value is obtained on the basis of voltage information given from the voltage sensor 18 as described above.

The graph showing the current indicates the measured current value of the current flowing through the AC electric path 3. The measured current value is obtained on the basis of current information given from at least one of the current sensor 17 and the current sensor 19 as described above.

From the graph showing the current in FIG. 9, it is found that the starting current is flowing during the period ΔT. That is, at a start timing Ts of the period ΔT, flow of the starting current is started, and at a finish timing Tf of the period ΔT, flow of the starting current is ended.

If it is determined that the measured current value is equal to or greater than the starting current threshold value (step S2 in FIG. 6), the power conversion device 1 decreases the voltage command value from the initial value, i.e., 101 volts, to the first set value, i.e., 80 volts (step S3), to start the starting current suppression process.

Thereafter, the power conversion device 1 adjusts the voltage command value in accordance with the measured current value, thereby adjusting the effective value of an AC voltage outputted from the power conversion unit 20. Thus, as the current value of the starting current gradually decreases, the effective value of the AC voltage is also adjusted so as to gradually increase.

Therefore, as shown in the graph showing the AC voltage in FIG. 9, it is found that the AC voltage sharply reduces at the start timing Ts. It is also found that, thereafter, the AC voltage is kept at a certain voltage, and in a period before the finish timing Tf, the AC voltage gradually increases as the current (measured current value) decreases.

At the finish timing Tf, the AC voltage has almost the same value as that before the start timing Ts.

Figure 10:
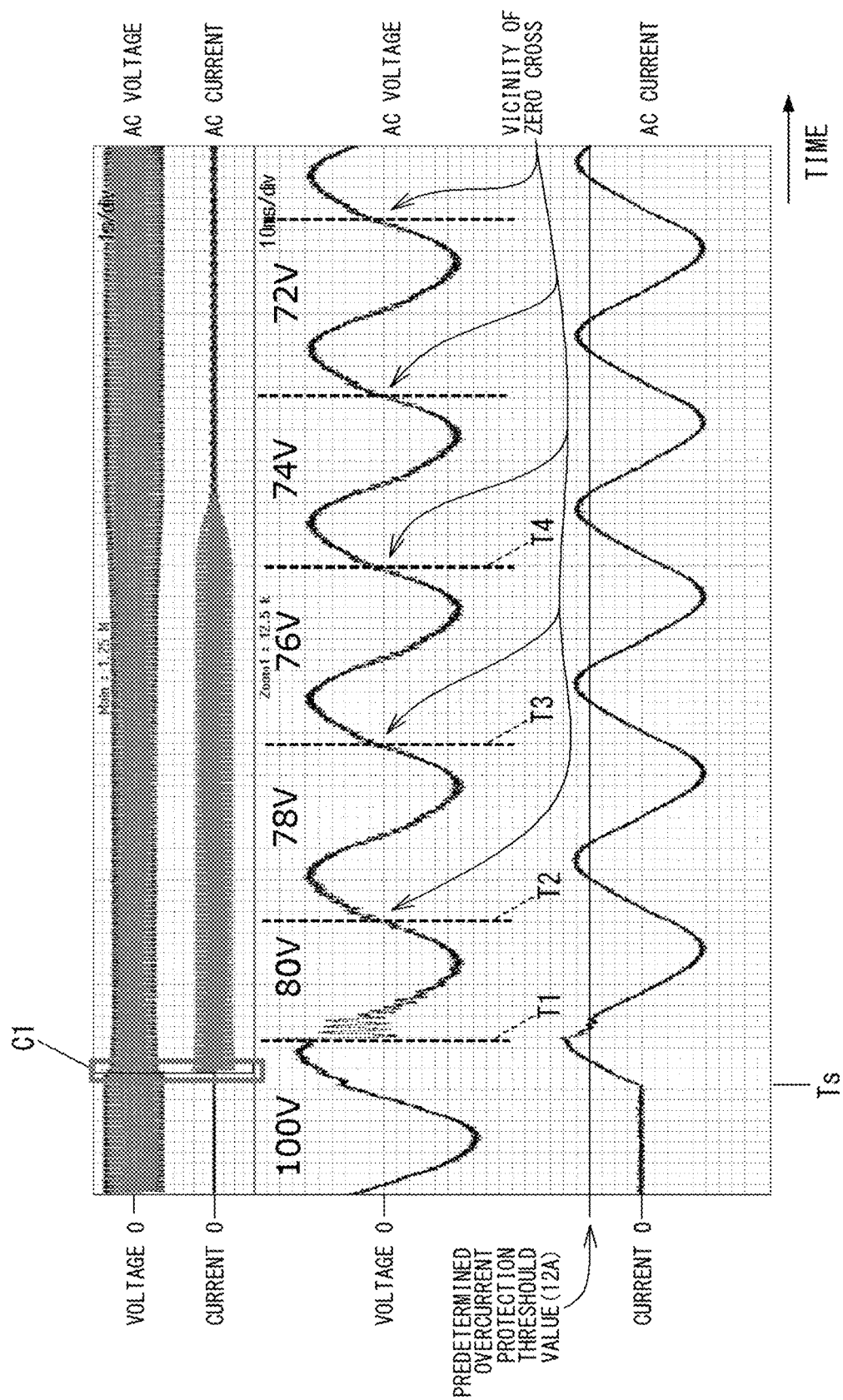
FIG. 10 shows enlarged graphs in the vicinity of a start timing Ts in FIG. 9.

FIG. 10 shows enlarged graphs in the vicinity of the start timing Ts in FIG. 9. In FIG. 10, the entirety of the graph showing the AC voltage and the graph showing the current in FIG. 9 is shown at the upper stage, and enlarged graphs in the vicinity of a rectangular part C1 (in the vicinity of start timing Ts) of the entire graphs at the upper stage is shown at the lower stage.

In FIG. 10, each voltage value shown in the graph showing the AC voltage indicates the voltage command value used for the control by the output voltage control unit 27.

In the graph showing the current in FIG. 10, it is found that flow of the starting current is started at the start timing Ts. It is noted that the voltage command value at this time is 100 volts as shown in FIG. 10.

Thereafter, in the graph showing the AC voltage, the voltage command value is decreased from 100 volts to 80 volts at a timing T1.

This is because, after the start timing Ts, the power conversion device 1 determined that the measured current value was equal to or greater than the starting current threshold value (step S2 in FIG. 6), decreased the voltage command value from 100 volts to the first set value, i.e., 80 volts at the timing T1 (step S3 in FIG. 6), and started the starting current suppression process.

After the timing T1, the voltage command value is decreased from 80 volts to 78 volts in the vicinity of a timing T2 which is a zero cross timing when the graph showing the AC voltage changes from negative to positive.

Similarly, the voltage command value is decreased from 78 volts to 76 volts in the vicinity of a timing T3 which is a zero cross timing, and then the voltage command value is decreased from 76 volts to 74 volts in the vicinity of a timing T4 which is a zero cross timing.

This is because, if the measured current value is equal to or greater than the overcurrent protection threshold value (step S11 in FIG. 7), the power conversion device 1 adjusts the voltage command value so as to be decreased on a 1-step (2-volt) basis until the measured current value becomes smaller than the overcurrent protection threshold value (step S14 in FIG. 7).

By decreasing the voltage command value as described above, the power conversion device 1 performs adjustment so as to decrease the effective value of an AC voltage outputted from the power conversion unit 20, thereby suppressing the starting current.

The power conversion device 1 is configured so that the effective value of the AC voltage is adjusted in the vicinity of a zero cross timing. Therefore, as shown in FIG. 10, it can be confirmed that, at each timing when the voltage command value was decreased by 2 volts in the graph showing the AC voltage, disturbance or the like does not appear in the waveform and thus voltage variation does not occur.

Figure 11:
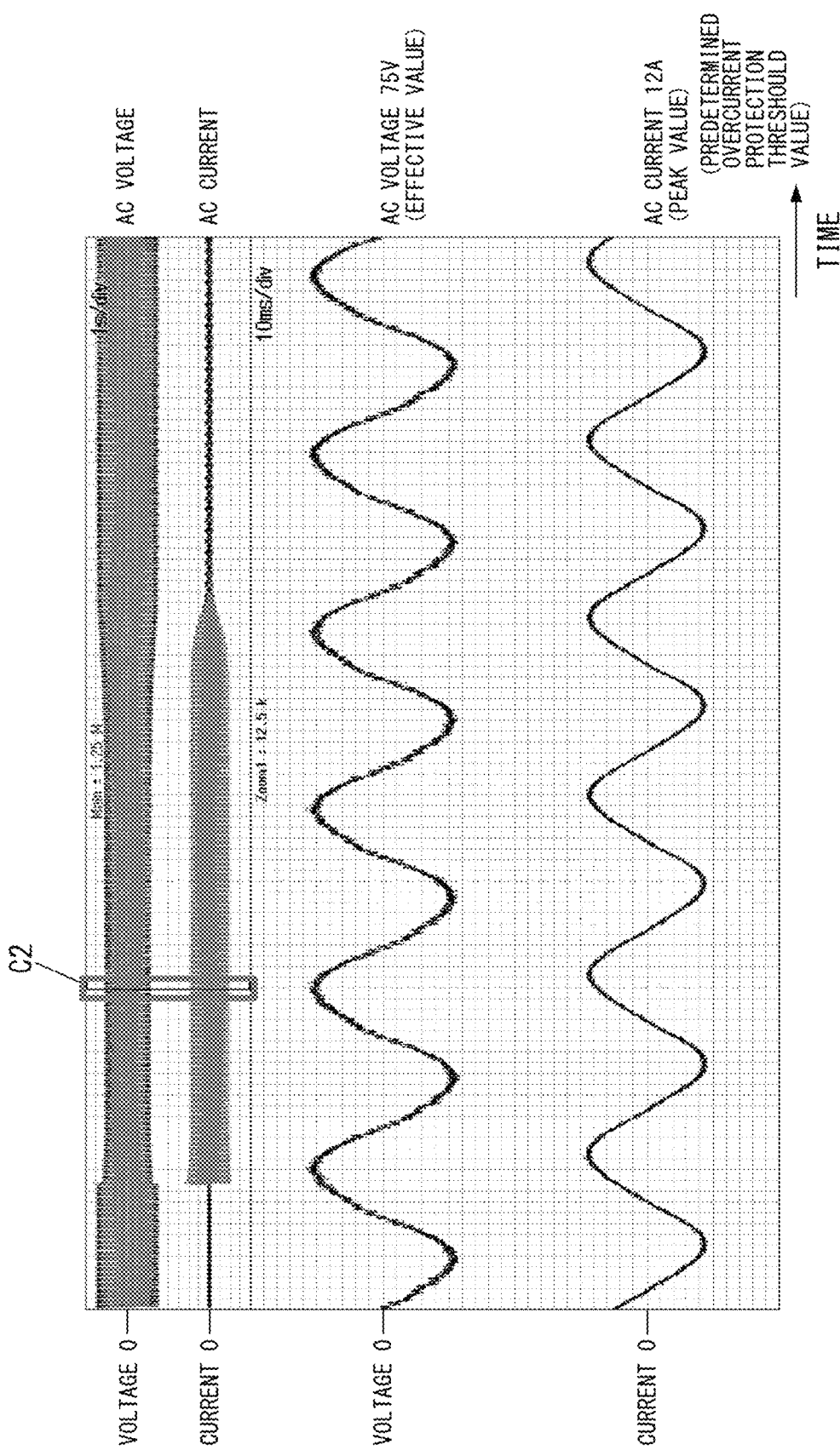
FIG. 11 shows enlarged graphs at a central part of a period ΔT in FIG. 9.

FIG. 11 shows enlarged graphs at a central part of the period ΔT in FIG. 9. In FIG. 11, the entirety of the graph showing the AC voltage and the graph showing the current in FIG. 9 is shown at the upper stage, and enlarged graphs in the vicinity (central part of period ΔT) of a rectangular part C2 of the entire graphs at the upper stage are shown at the lower stage.

In FIG. 11, the effective value of the graph showing the AC voltage is 75 volts. In addition, the peak value of the graph showing the current is 12 amperes.

If the measured current value is equal to or greater than the overcurrent protection threshold value (12 amperes) (step S11 in FIG. 7), the power conversion device 1 performs adjustment so as to decrease the voltage command value (step S14 in FIG. 7), and if the measured current value is smaller than the overcurrent protection threshold value (12 amperes) (step S11 in FIG. 7), the power conversion device 1 performs adjustment so as to increase the voltage command value (step S17 in FIG. 7).

Therefore, as shown in FIG. 11, during a period in which the starting current is flowing, the power conversion device 1 adjusts the effective value of an AC voltage outputted from the power conversion unit 20 so that the measured current value becomes constant at the overcurrent protection threshold value (12 amperes).

If the measured effective value is equal to or smaller than the lower limit value (75 volts) (step S13 in FIG. 7), the power conversion device 1 keeps the voltage command value at that time without changing the voltage command value (step S15 in FIG. 7).

In FIG. 11, it can be confirmed that the value of the current flowing through the AC electric path 3 is suppressed to 12 amperes as compared to 24 amperes of the current value of the starting current.

It is noted that, in this verification test, the measured current value becomes the overcurrent protection threshold value (12 amperes) when the effective value of the AC voltage is the lower limit value, i.e., 75 volts.

As described above, even if a starting current flows through the AC electric path 3, the power conversion device 1 performs adjustment so as to decrease the effective value of an AC voltage outputted from the power conversion unit 20, thereby suppressing the starting current.

Thereafter, the power conversion device 1 further adjusts the effective value of an AC voltage outputted from the power conversion unit 20 so that the measured current value becomes constant at 12 amperes. Thus, it is possible to continuously suppress the starting current.

Figure 12:
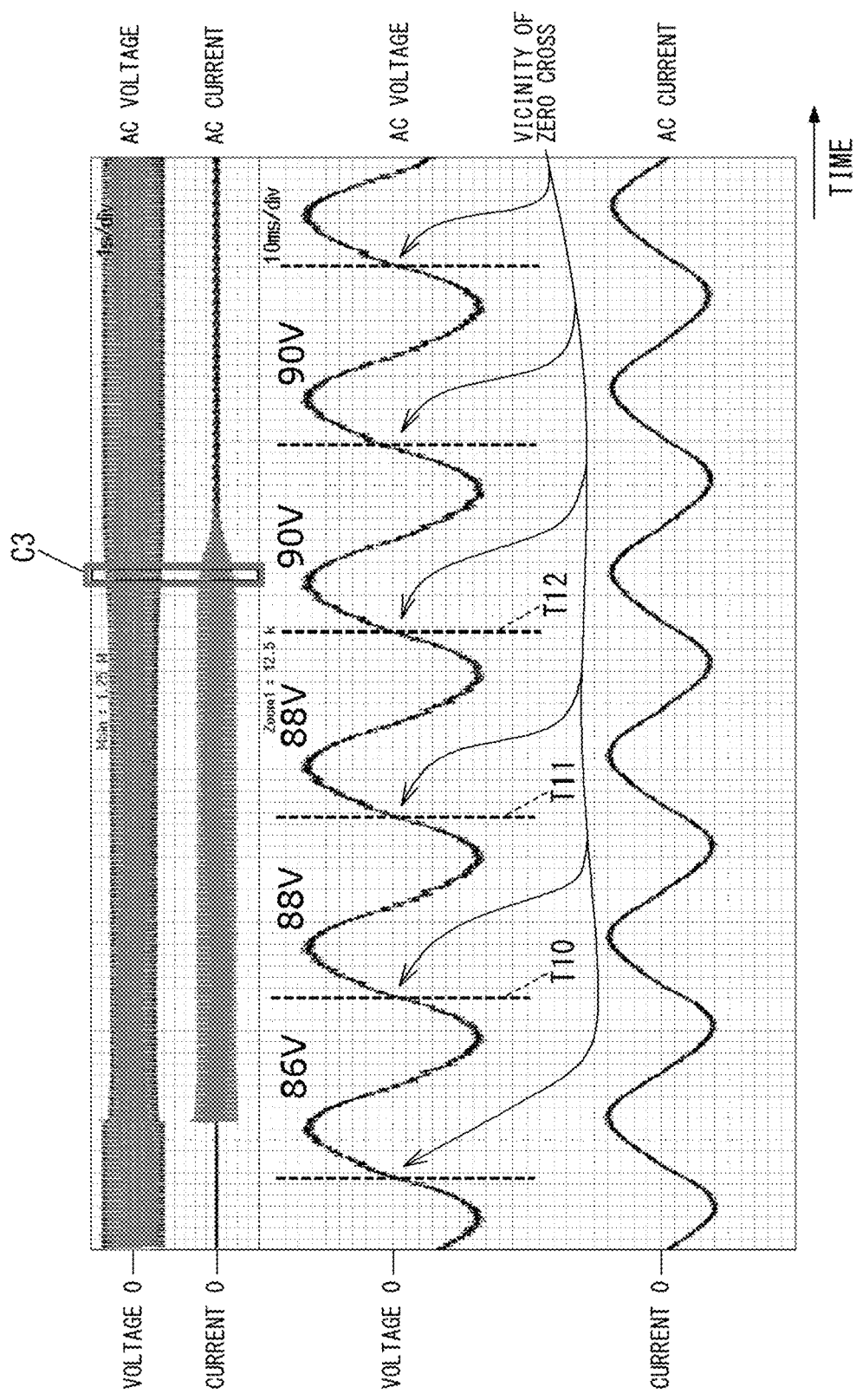
FIG. 12 shows enlarged graphs in the vicinity of a finish timing Tf in FIG. 9.

FIG. 12 shows enlarged graphs in the vicinity of the finish timing Tf in FIG. 9. In FIG. 12, the entirety of the graph showing the AC voltage and the graph showing the current in FIG. 9 is shown at the upper stage, and enlarged graphs in the vicinity (vicinity of finish timing Tf) of a rectangular part C2 of the entire graphs at the upper stage are shown at the lower stage.

In FIG. 12, each voltage value shown in the graph showing the AC voltage indicates the voltage command value used for the control by the output voltage control unit 27.

In FIG. 12, the voltage command value is increased from 86 volts to 88 volts at a timing T10 in the vicinity of a zero cross timing when the graph showing the AC voltage changes from negative to positive.

The voltage command value is kept at 88 volts at a timing T11 which is a zero cross timing, and the voltage command value is increased from 88 volts to 90 volts in the vicinity of a timing T12 which is a zero cross timing.

This is because, if the measured current value is smaller than the overcurrent protection threshold value (step S11 in FIG. 7), the power conversion device 1 performs adjustment so as to increase the voltage command value on a 1-step (2-volt) basis (step S17 in FIG. 7).

Thus, as the measured current value (current value of starting current) gradually decreases, the power conversion device 1 performs adjustment so that the effective value of the AC voltage also gradually increases in accordance with the decrease in the measured current value, as shown in FIG. 12.

In addition, the power conversion device 1 adjusts the effective value of the AC voltage in the vicinity of a zero cross timing. Therefore, in the graph showing the AC voltage in FIG. 12, it can be confirmed that, at each timing when the voltage command value is increased by 2 volts, disturbance or the like does not appear in the waveform and thus voltage variation does not occur.

From the above verification test result, it can be confirmed that, even if a starting current flows through the AC electric path 3, the power conversion device 1 performs adjustment so as to decrease the effective value of an AC voltage outputted from the power conversion unit 20, thereby suppressing the starting current.

Thereafter, the power conversion device 1 further adjusts the effective value of an AC voltage outputted from the power conversion unit 20 so that the measured current value becomes constant at the overcurrent protection threshold value (12 amperes). Thus, it can also be confirmed that the power conversion device 1 can continuously suppress the starting current.

It is noted that the embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST 1 power conversion device
2 DC power supply
3 AC electric path
4 load
5 DC-side capacitor
6 DC/DC converter
7 DC reactor
8 DC bus
9 intermediate capacitor
10 inverter
11 filter circuit
12 AC reactor
13 AC-side capacitor
14 control unit
15 voltage sensor
16 current sensor
17 current sensor
18 voltage sensor
19 current sensor
20 power conversion unit
24 current value
25 determination unit
26 adjustment unit
27 output voltage control unit
28 first adder
29 compensator
30 second adder
d1 diode
Q1 to Q6 switching element

The invention claimed is:

1. A power conversion device comprising:
a power conversion unit provided between a DC power supply and an AC electric path and configured to perform DC/AC power conversion; and
a control unit configured to control the power conversion unit, wherein
the control unit includes
a determination unit configured to compare a value of a current flowing through the AC electric path with a predetermined starting current threshold value set at a value larger than a rated current value of the power conversion device, and to determine whether or not a starting current has flowed through the AC electric path on the basis of a comparison result of the value of a current flowing and the starting current threshold value, the starting current being a current that temporarily flows and being larger than the rated current value, and
an adjustment unit configured to adjust an AC voltage generated by the power conversion unit, on the basis of a result of the determination by the determination unit, wherein
the adjustment unit adjusts to decrease the AC voltage when the result of the determination indicates that the starting current flows through the AC electric path.

2. The power conversion device according to claim 1, wherein
the power conversion unit includes
a DC/DC converter provided between the DC power supply and a DC bus and configured to boost a DC voltage of the DC power supply to a predetermined intermediate voltage, and
an inverter connected between the DC bus and the AC electric path and configured to convert the intermediate voltage to an AC voltage waveform, and
the adjustment unit adjusts a voltage for the DC bus generated by the DC/DC converter and the AC voltage, on the basis of a result of the determination by the determination unit.

3. The power conversion device according to claim 1, wherein the adjustment unit adjusts a voltage command value for adjusting the AC voltage in a vicinity of zero cross of an AC waveform of the AC voltage.

4. The power conversion device according to claim 1, wherein the control unit compares the value of the current flowing through the AC electric path with a predetermined overcurrent protection threshold value being a value between the rated current value and the starting current threshold value, and the adjustment unit adjusts the AC voltage generated by the power conversion unit, on the basis of a result of the determination by the determination unit and a result of comparison between the value of the current flowing through the AC electric path and the predetermined overcurrent protection threshold value.

5. The power conversion device according to claim 2, wherein the control unit controls the power conversion unit such that, for generating the AC voltage from the DC voltage, a first period during which the DC/DC converter boosts the DC voltage and the inverter performs one of polarity non-inversion passing and polarity inversion passing, and a second period during which the DC/DC converter is stopped and the inverter performs step-down operation and one of polarity non-inversion passing and polarity inversion passing, arise alternately in one AC cycle.

6. A control method for a power conversion device including a power conversion unit provided between a DC power supply and an AC electric path and configured to perform DC/AC power conversion, the control method comprising:

a determination step of comparing a value of a current flowing through the AC electric path with a predetermined starting current threshold value set at a value larger than a rated current value of the power conversion device, and determining whether or not a starting current has flowed through the AC electric path on the basis of a comparison result of the value of a current flowing and the starting current threshold value, the starting current being a current that temporarily flows and being larger than the rated current value, and an adjustment step of adjusting an AC voltage generated by the power conversion unit, on the basis of a result of the determination in the determination step, wherein in the adjustment step, the AC voltage is decreased by adjusting when the result of the determination indicates that the starting current flows through the AC electric path.

\* \* \* \* \*